(12) United States Patent
Hays

(10) Patent No.: US 7,945,559 B2
(45) Date of Patent: May 17, 2011

(54) COMPLETION OF PARTIALLY SPECIFIED PATHS

(75) Inventor: Christopher Alan Hays, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 11/386,298

(22) Filed: Mar. 22, 2006

(65) Prior Publication Data

US 2007/0226337 A1  Sep. 27, 2007

(51) Int. Cl.
*G06F 7/02* (2006.01)
*G06F 17/30* (2006.01)

(52) U.S. Cl. .................. 707/714; 707/716; 707/718

(58) Field of Classification Search .............. 707/2, 3, 707/4, 999.002, 999.003, 999.004, 716, 718, 707/714

See application file for complete search history.

(56) References Cited

U.S. PATENT DOCUMENTS

| | | | |
|---|---|---|---|
| 4,424,100 A | 1/1984 | McCarty et al. | |
| 5,037,668 A | 8/1991 | Nagy | |
| 5,423,035 A | 6/1995 | DePrez | 395/600 |
| 5,617,567 A | 4/1997 | Doktor | 395/602 |
| 5,701,460 A | 12/1997 | Kaplan et al. | 395/603 |
| 5,812,840 A | 9/1998 | Shwartz | 395/604 |
| 5,822,747 A * | 10/1998 | Graefe et al. | 1/1 |
| 6,397,204 B1 | 5/2002 | Liu et al. | 707/2 |
| 6,421,663 B1 | 7/2002 | Chen et al. | 707/3 |
| 6,495,624 B1 | 12/2002 | Brown | |
| 6,516,310 B2 | 2/2003 | Pauley | 707/2 |
| 6,640,221 B1 | 10/2003 | Levine et al. | 707/3 |
| 6,985,899 B2 | 1/2006 | Chan et al. | 707/6 |
| 7,098,270 B2 | 8/2006 | Hochgesang et al. | |
| 2003/0212662 A1 | 11/2003 | Shin et al. | 707/2 |
| 2005/0065927 A1 | 3/2005 | Nouri et al. | 707/4 |
| 2005/0065949 A1 | 3/2005 | Warner et al. | 707/100 |
| 2005/0160090 A1 * | 7/2005 | Harjanto | 707/3 |
| 2006/0293439 A1 | 12/2006 | Hetherington | |
| 2008/0091668 A1 * | 4/2008 | Dettinger et al. | 707/4 |

FOREIGN PATENT DOCUMENTS

EP   1386943 A1   2/2004

OTHER PUBLICATIONS

Lawrence, R., et al., "Querying relational databases without explicit joins," http://www.cs.uiowa.edu/~rlawrence/research/Papers/DASWIS_LB01.pdf, 14 pages.

Maness, A.T., et al., "Automatic program generation for processing a high level relational-like query language," ACM, 1979, 62-68.

(Continued)

*Primary Examiner* — James Trujillo
*Assistant Examiner* — Bruce M Moser
(74) *Attorney, Agent, or Firm* — Woodcock Washburn LLP

(57) ABSTRACT

Mechanisms are provided for completing partially specified paths. For example, users can partially specify paths by specifying some preferred entities and roles along the paths so that these paths have to incorporate these preferred entities and roles. From then, queries can automatically complete the paths, unless more specification information is needed. In completing these paths, numerous restrictions can be used, such as a role and its inverse cannot be used in a path, and no role may be traversed more than once in a path.

20 Claims, 7 Drawing Sheets

OTHER PUBLICATIONS

Missier, P., et al., "Extending a multidatabase manipulation language to resolve schema and data conflicts," http://www.missier.it/professional/doc/multidb-DS6.pdf, 22 pages.

Whang, K.-Y., et al., "Separability as a physical database design methodology," *Stanford University and SRI International*, 1982, 1-60.

* cited by examiner

Path (Customer.Name, Product.Name) = Customer.Name (A) Order (B) Line Item (C) Product.Name

[502] Given a partially specified path P between two entities in a query

[504] And given a copy of the semantic model M used for the query

[506] For each role R in path P
    Remove the role R and its inverse from the model M

[508] For each entity E with an omitted role in path P
    The entity prior to E in the path P is considered the starting entity S for a missing subpath
    Based on the model M, determine a default path DP from the entity S to the entity E

[510] If exactly one default path DP was found
        Insert the path DP between S and E in the original path P For each role R in path DP
        Remove the role R and its inverse from the model M

[512] If more than one default path DP was found
        Remember the set of default path for that entity DP(E)

[514] If no default path DP was found, terminate this program

[516] For each possible combination C of one default path DP(E) for each entity E which still has an omitted role in path P
    If no role or its inverse appears more than once in the default paths DP(E) in the combination C
        Add C to the list of valid combinations VC

[518] For each valid combination VC
    Create a new valid path VP, which is a copy of the modified original path P
    For each default path DP(E) in the valid combination VC
        Insert the path DP(E) before the entity E in the path VP
    Add the path VP to the set of possible fully specified paths

Fig. 5

COMPLETION OF PARTIALLY SPECIFIED PATHS

CROSS-REFERENCE TO RELATED SUBJECT MATTER

The present application is related to U.S. patent application Ser. No. 11/158,424, filed Jun. 21, 2005, entitled "Traversing a Relational Model with Preferred Paths."

FIELD OF TECHNOLOGY

The present subject matter relates to the field of computing, and more particularly, to databases, although databases are merely an exemplary and non-limiting field of the presently disclosed subject matter.

BACKGROUND

Querying databases for information can be cumbersome and complicated. Database entities, such as tables, may be related to other entities, such as other tables, in complicated ways. For example, if a user wants to query what products a customer has bought, one way of doing this would be to query a particular customer in a particular table, and then associate this information with corresponding customer products in another table.

The problem with such querying is that a myriad of unwanted results can be returned. For example, for a particular customer, product information can be returned that relates to not only sales (i.e. what products the customer has bought), but also other information specifying what products the customer has returned, ordered (but maybe not bought), browsed, inquired about, and so on. Sometimes such querying may be simple if a user provides enough information in a query, but at other times obtaining the intended query for a user may be difficult, especially when the user does not provide enough query information, or perhaps, does not even fully appreciate how to query for intended information in the first place. Thus, it would be advantageous to provide mechanisms to surmise intended user queries (and other database functionalities) in an efficient and accurate manner.

SUMMARY

Mechanisms are provided herein for completing partially specified query paths, thereby surmising intended user queries. In one exemplary (and hence non-limiting) aspect of the presently disclosed subject matter, a source entity is identified, where the source entity corresponds to the starting point of a query path. The query path can have a plurality of entities and roles. Moreover, a target entity is also identified, where the target entity corresponds to the ending point of the query path. With this in place, a query can be performed such that the query subscribes to several restrictions and specifications. Specifically, a first restriction can be put in place, where the first restriction disallows the use of a role and its inverse in the query path. Furthermore, a second restriction can be put in place, where the second restriction disallows using the same role twice (or more times) in the query path.

In addition to restrictions, an option for providing entity specification is made (hence making this a partially specified path). Thus, at least one entity in the query path can be specified as a preferred entity through which the query path should (or in some cases must) pass. Optionally, at least one role in the query path can also be specified as a preferred role through which the query path should (or must) pass. With such restrictions and specifications in place, a determination can be made regarding the validity of a query path. If a query path is valid, it can be automatically completed, depending upon whether only one such query path exits (if more than one does exist, users can be further prompted for input to provide further specification).

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 5 illustrates in pseudo-code an exemplary implementation of the specifications discussed with reference to FIGS. 1 and 2, and the restrictions discussed with reference to FIG. 4;

DETAILED DESCRIPTION

General Aspects of Automatic Completion of Partially Si)ecified Join Paths

The terminology used in the presently disclosed subject matter is well known to those of skill in the art. Thus, terms such as "entity," "join," "role," "path," and so on, do not have to be expounded upon, other than to say that an "entity" may be a subject of a query or other database functionality, a join may be the relationship between entities, a "role" may be the direction of a "join," a "path" may be some combination of entities and joins, and so on. This Detailed Description envisions all kinds of aspects of the subject matter relating to these terms. Thus, for example, in typical and non-limiting aspect, a "path" may be an alternating combination of entity, role, entity, role, entity, role, entity, etc.

Figures 1A, 1B:
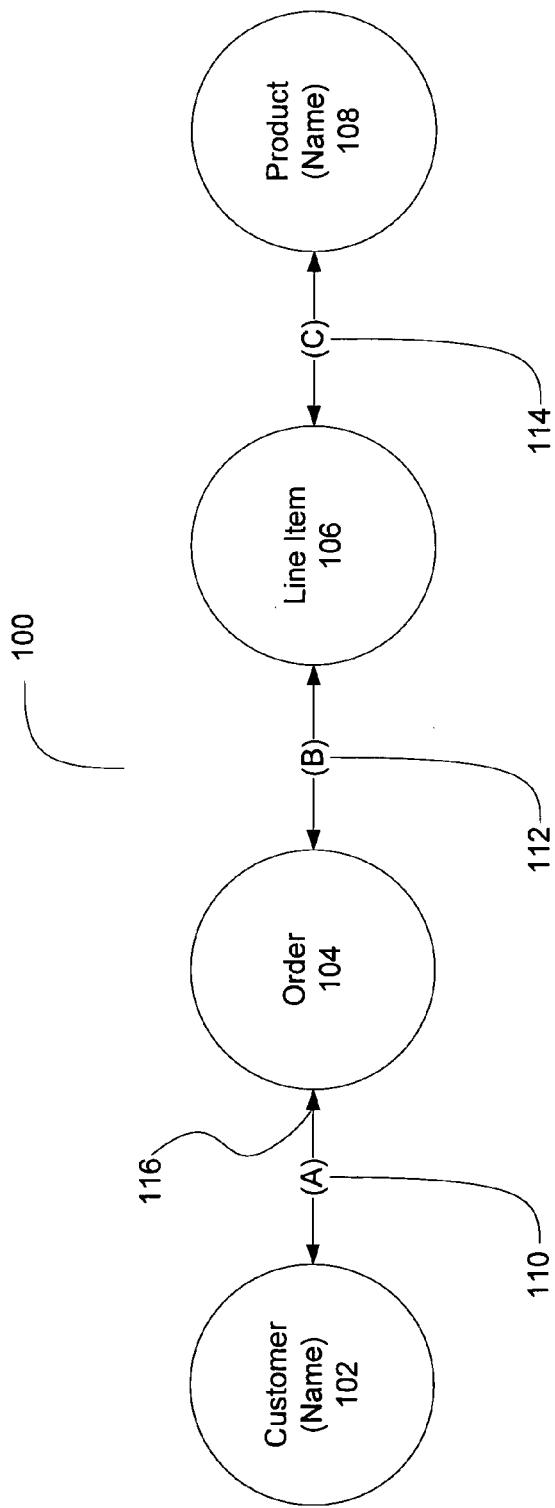
FIG. 1A illustrates a simple example of a query that may obtain the name of a customer and any product names that might be associated with that customer, when the query path is unambiguous.
FIG. 1B is a compliment figure to FIG. 1A, and it illustrates the text version of the diagram in FIG. 1A.

FIG. 1A illustrates a simple example 100 of a query that may obtain the name of a customer and any product names that might be associated with that customer. Thus, per FIG.

1A, a customer entity 102 is shown, where the query with regard to this entity 102 attempts to determine product names associated with the customer. This entity 102 could be referred to as the source entity, in that it is the starting point of the query 100. Conversely, the product entity 108 may be deemed the target entity, in that it is the ending point of the query.

Between these two entities 102, 108, lie two more entities 104, 106. In a typical relational database, for example, entities such as the source entity 102 and the target entity 108 may not be directly related, having intervening entities 104, 106 between them. All of these entities 102, 104, 106, 108 may be related by joins, or more specifically, by roles 110, 112, 114, as these terms are understood by those of skill in the art and defined above. Thus, the customer entity 102 is related by role A 110 to the order entity 104. The order entity 104, in turn, may be related to the line item entity 106 by role B 112. Finally, the line item entity 106 may be related to the product entity 108 by role C 114. In the end, the task of the query is to get from the source entity 102 to the target entity 108, going through any intervening entities and roles.

Another way to understand this is illustrated in FIG. 1B. FIG. 1B illustrates the text version of the diagram of FIG. 1A. Thus, a path for a query can be described as: Path (Customer.Name.Product.Name)=Customer.Name (A) Order (B) Line Item (C) Product.Name. Here, it is apparent that the start of a query for a cutomer's name ends in a product name. The path from the customer's name to the associated product name goes through role A, to the order entity, then through role B to the line item entity, and finally, through the C role to the intended product name. Thus, for instance, if a particular customer A has ordered several product of a particular name, all these product names will be returned as a result of the query. Interestingly, in this case, the path between the customer entity 102 and the product entity 108 is fully unambiguous, since there is only one query path to follow.

Figure 2:
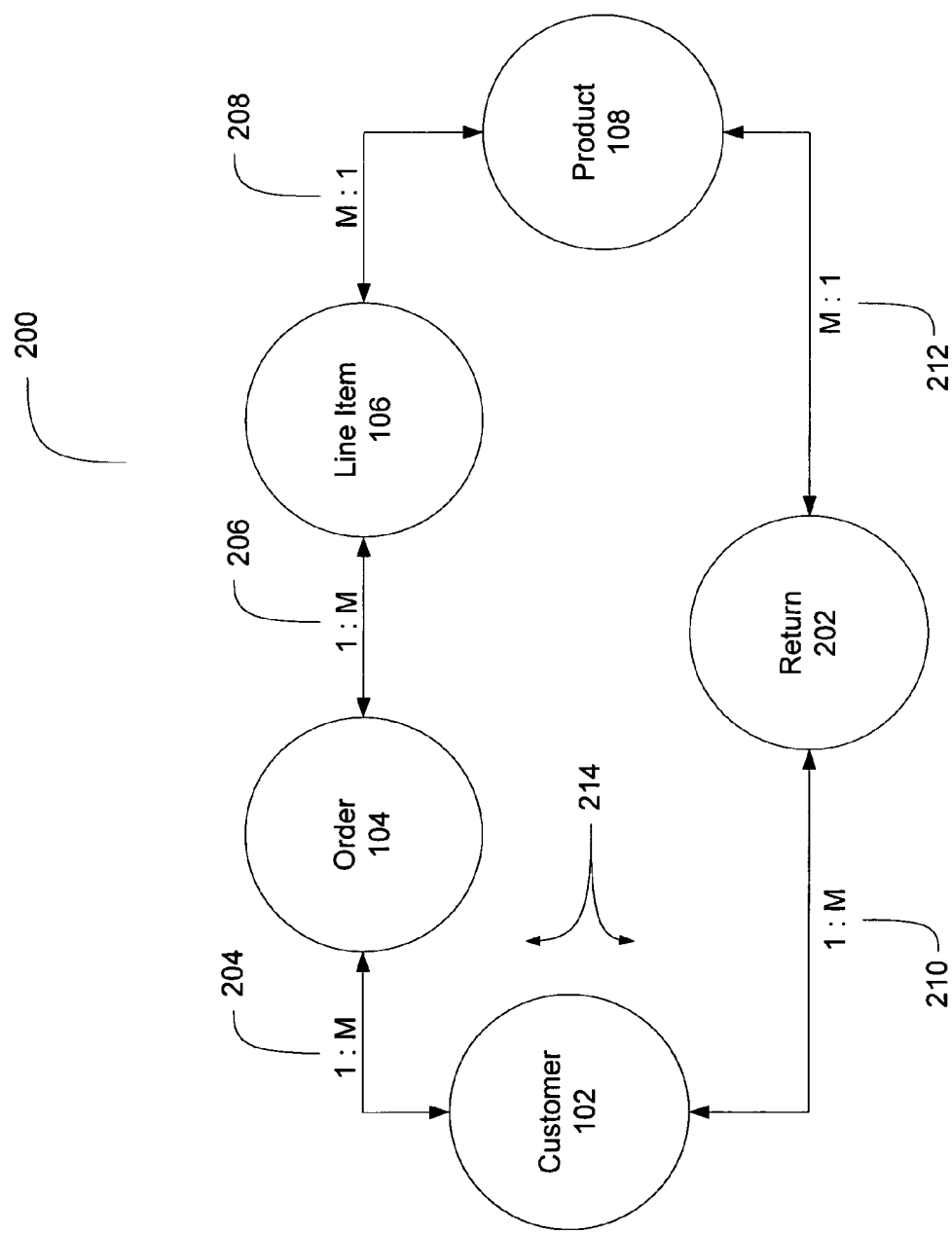
FIG. 2 illustrates a scenario where the query path may be ambiguous, and where an entity specification along an otherwise unspecified path helps to determine a valid query path.

In contrast, FIG. 2 presents a scenario 200 where the query paths are ambiguous. In other words, FIG. 2 illustrates a more complicated situation 200 where various paths may be taken from a customer entity 102 to a product entity 108. As in FIG. 1, there is an intervening order entity 104 and a line item entity 106. However, additionally, now there is also a return entity 202 present. The return entity 202 presents an ambiguity 214 to this scenario 200, since one of two paths could be taken from the customer entity 102 to the product entity 108. The query path could either (1) be the same as in FIG. 1, going from the customer entity 102 to the product entity 108 via the order 104 and line item 106 entities, or (2) it could go through the return entity 202.

One restriction that might guide which path to choose can be based on the cardinality of roles between entities. Various cardinality relationships 204, 206, 208, 210, 212 are shown in FIG. 2. For example, the role between the customer entity 102 and the order entity 104 has a cardinality of one to many (1:M) 204. This means that for every one customer there may be many orders (but not vice versa). The cardinality restriction in question can stipulate that in going through a path there should be less than two changes in cardinality.

In FIG. 2, it can be seen that there is one change in cardinality in the order entity 104 and line item path 106. Specifically, the relationship between the customer entity 102 and the order entity 102 is one to many (1:M) 204. The relationship between the order entity 104 and the line item entity 106 is also one to many (1:M) 206, since one order can have many items. However, in going from the line item entity 106 to the product entity 108, there is a change in cardinality. Specifically, the relationship between the line item entity 106 and the product entity 108 is many to one (M:1) 208, since a product can have many associated line items. This change in cardinality, from 1:M 206 to M:1 208, would violate a rule that forbids changes in cardinality when going through a path. Based on heuristics, in one aspect of the presently disclosed subject matter, a more optimal rule limits not one change in cardinality but two or more changes in cardinality.

FIG. 2 also shows that the relationship between the customer entity 102 and the return entity 202 is one to many (1:M) 210, since a customer can have many returns. In turn, the relationship between the return entity 202 and the product entity 108 is many to one (M:1) 212, since many returns may be associated with a product, such a defective product. It can be seen that this path involving the return entity 202 also has one change in cardinality, namely, in going from 1:M 210 to M:1 212. Thus, in FIG. 2, these paths are equally optimal from a query point of view, even though one path 102, 104, 104, 108 can potentially have more entities and roles than another path 102, 202, 108.

To specify, then, which path is more optimal, the query can be modified to partially specify a path by adding one entity along the path. In FIG. 2 this could be done in one of three ways. First, the order entity 104 could be specified as an entity that the query has to pass through; second, the line item entity 106 could be so specified; and third, the return entity 202 could be so specified. For example, if the line item entity 106 is specified by a user, through a user interface, perhaps, as an entity along a query path, then the path will pass through this entity. This specification will resolve any ambiguities 214, since now the path has to pass from the customer entity 102 to the order entity 104, then the specified line item entity 106, and to the product entity 108.

Conversely, if the return entity 202 is specified by a user (or, alternatively, by some process that does not have to include user interaction) as an entity that the path has to pass through, then this also resolves any ambiguities 214, since after such a specification the only path remaining is the customer entity 102, return entity 202, and product entity 108 path. Either way, whether one of the order entity 104 and line item entity 106 is so designated, or the return entity 202 is so designated, such designation will disambiguate any path ambiguities 214 in the query. In short, specifying an entity as a preferred entity along a path is a way to partially specify the path and hence make such a path less ambiguous—in some cases completely unambiguous, as in FIG. 2, and in others merely less ambiguous than before the specification.

Figure 3:
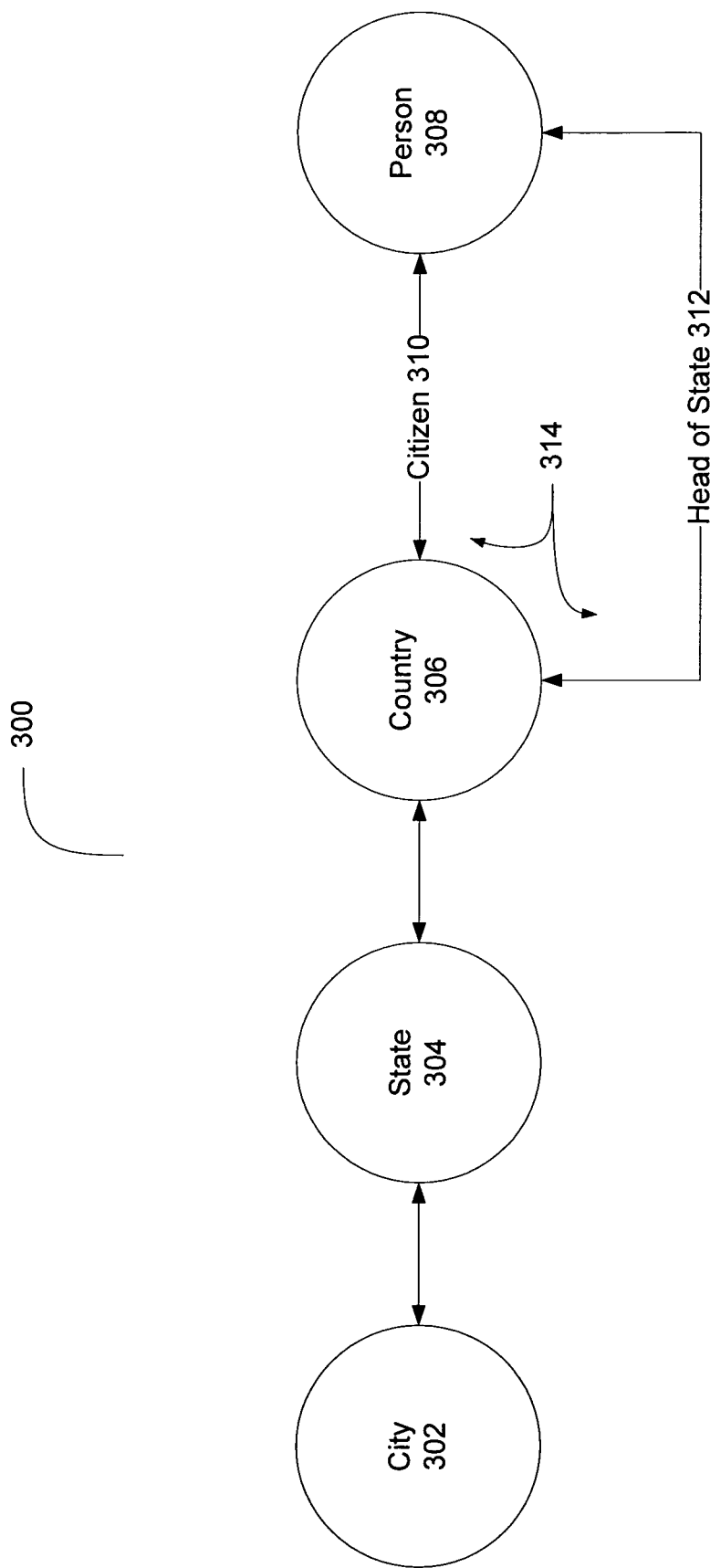
FIG. 3 illustrates the notion that the designation of preferred roles can be used to (further) disambiguate any ambiguous query paths.

FIG. 3 illustrates the notion that the designation of preferred roles can be used to (further) disambiguate any ambiguous query paths. In FIG. 3, a city entity 302 is shown, with a many to one relationship to a state entity 304 (since there may be many cities in a state). Similarly, the state entity 304 is shown with a many to one relationship to a country 306 (since there may be many states in a country). So far, the path from the city entity 302 to the country entity 306 is unambiguous, since there is only one path between these entities. However, the path between the country entity 306 and the person entity 308 is ambiguous 314.

This ambiguity 314 arises from the fact that one of two roles could be chosen to get from the country entity 306 to the person entity 308: either (1) the citizen role 310 or (2) the head of state role 312. If, for example, the head of state role 312 is designated as a preferred role, then the original path from the city entity 302 to the person entity 308 is unambiguous, since at this point it is fully specified: start at city entity 302, go to state entity 304, then to country entity 306, and then on the head of state role 312 to the person entity 308. Alternatively, the citizen role 310 could have been chosen as the preferred role, in which case the path would also have been disambiguated in the following manner: start at city entity 302, go to state entity 304, then to country entity 306, and then on the citizen role 310 to the person entity 308.

Figure 4:
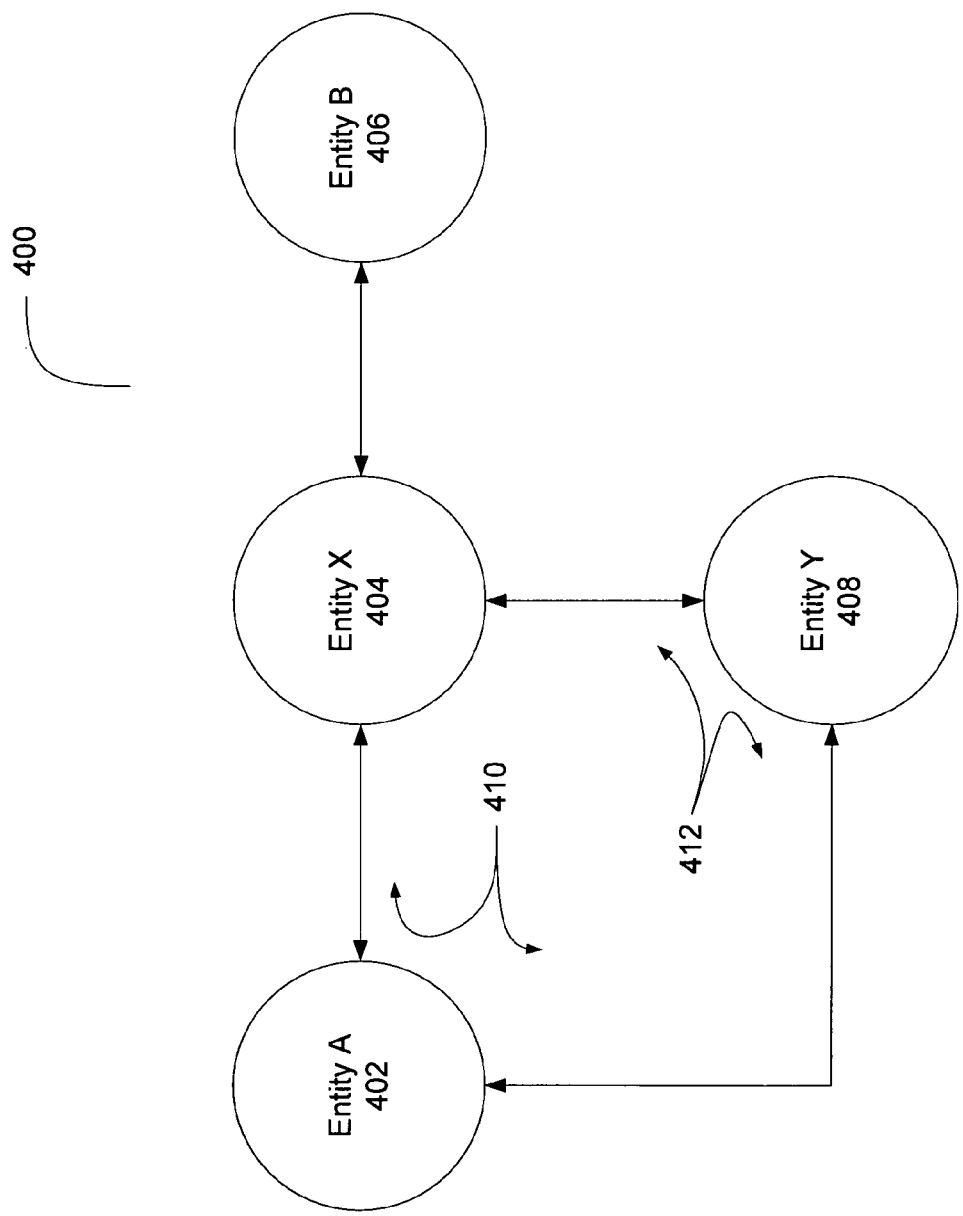
FIG. 4 illustrates the notion that at least two restrictions can be used along any given path to further disambiguate any path ambiguities, where one of the restriction limits the use of a role and its inverse, and the other restriction limits the use of the same role twice (thus preventing looping behavior)

In addition to the preferred entity and preferred role designations discussed with reference to FIGS. 2 and 3, respectively, FIG. 4 illustrates the notion that at least two restrictions can be used along any given path to further disambiguate any path ambiguities. In FIG. 4, some generic entity A 402 is given, where this entity may be the source entity of a query. Entity A 402 is related to entity X 404 and entity Y 408, where, furthermore, entity X 404 is related to entity Y 408. The target entity in this setup may be entity B. As is shown in FIG. 4, there are several ambiguous paths 410, 412 from the source entity A 402 to the target entity B 406.

Specifically, the first ambiguous path occurs in going from entity A 402 to either entity X 404 or entity Y 408. A second ambiguity can arise if the entity Y 408 path is chosen, since when at entity Y 408, a choice has to be made as to whether to go back to entity A 402 or to entity X 404. One restriction that can help resolve this ambiguity is the following: any given path should not contain a role and its inverse. Thus, following this rule, a path could not contain the role from entity A 402 to entity Y 408, and then a role back from entity Y 408 to entity A 402. Per this no-role-and-its-inverse restriction, it would appear that once the path starts at entity A 402 and goes to entity Y 408, the only remaining choice is to proceed to entity X 404.

Once at entity X 404, it would appear that the natural choice would be go proceed to entity B 406. However, the path is triply ambiguous (not pictured) at entity X 404: from entity X 404, the path could proceed (1) back to entity Y 408, (2) back to entity A 402, or (3) on to entity B 406. In the first of these cases, proceeding back to entity Y 408 is not an option, on pain of violating the no-role-and-its-inverse restriction. The second case presents an interesting scenario, which gives rise to a second path traversal restriction: there is to be no looping or going through the same role twice.

This second restriction can be more easily appreciated by closely examining FIG. 4. If, at the outset, the path starts at entity A 402, and then proceeds to entity Y 408, and then on to entity X 404, then once the path is at entity X 404, the second of the above mentioned cases (going back to entity A 402) is also not a possibility, because the entire path would have to consist of: entity A 402, entity Y 408, entity X 404, entity A 402 (again), entity Y 408 (again), back to entity X 404, and finally entity B 406. This second restriction prevents this kind of looping behavior by restricting a path going through the same role twice. In fact, this last path violates this second restriction twice: (1) by going through the role between entity A 402 and entity Y 408 twice, and (2) by going through the role between entity Y 408 and entity X 404 twice.

It is interesting to note that various subpaths in the context of the above discussed path have more than one valid path (e.g. from entity A 402 to entity Y 408 to entity X 404, or from entity A 402 to entity X 404, etc.) but in combination with other paths only few (if any) paths may be valid. For example, the subpath from entity A 402 to entity Y 408 to entity X 404 is valid per se, but in combination with any path other than the path to entity B 406, it is invalid (namely, in combination with another subpath such as from entity X 404 to entity Y 408 to entity A 402, to entity X 404, and entity B 406; or, from entity X 404 to entity A 402 to entity Y 408 to entity X 404, and to entity B 406). In other words, once the two above mentioned restrictions are put in place rules (no role and its inverse, and no same role twice), various paths consisting of valid subpaths may become invalid.

Thus, these restrictions can help in the eventual determination of an entire valid path. Also, as mentioned above, the designation of preferred entities and preferred roles can further help a user to arrive at a valid path. After these two restriction rules and preferred designations are put in place, one of three possibilities can occur: (1) either there is no one valid path; (2) there is exactly one valid path; or (3) there is more than one valid path. In the first case, a query cannot be made between a source object and a target object, since no valid path exists between the two entities (or alternatively, restrictions can be relaxed at this point to allow a query to be made—in particular, more than two cardinality changes can be allowed, and if after relaxing such restrictions there still no valid path, then the query will not be made). In the second case, if one valid path exits, this path can be chosen automatically (without user interaction) as the path for a query. In the third case, a user can be prompted to further specify which role or path is preferred or necessary in a query. The following section, with reference to FIG. 5, presents a general algorithm to capture the above discussed subject matter in a pseudo-code implementation.

Exemplary Aspects of a Pseudo-Code Implementation

FIG. 5 illustrates in pseudo-code 500 one exemplary and non-limiting implementation of the above discussed subject matter. In the first section 502 of the pseudo-code 500, a partially specified path P between two entities in a query is obtained. The two entities may be an initial source entity and a final target entity for the entire path P. Thus, for example, the following path can be queried: $P = E_1 ( ) E_2 (R_3) E_3 ( ) E_4 ( ) E_5$. In this example, $E_1$ would be the initial source entity and $E_5$ would be the final target entity. The path P is partially specified in the sense that not all the roles, symbolically represented as brackets "( )", are provided for the path with entities $E_1, E_2, E_3, E_4$ and $E_5$. One role is provided, namely, $R_3$, but the rest of the roles are not provided.

Next, in the second section 504, a copy of the semantic model M used for the query is obtained. With this information in place, in the third section 506, for each role R in path P, the role R and its inverse is removed from the model M. One reason for the removal is to eliminate roles that are already being used in the query, as for example, R3 above. This guarantees that roles are not used more than once in this pseudo-code 500, per one of the restrictions mentioned above. Following this step, in section four 508, a loop is constructed with a conditional statement providing that for each entity E with an omitted role in path P, the entity prior to E in the path P is considered as the starting entity S for a missing subpath.

To make this concrete and using the example from above, with $P = E_1 ( ) E_2 (R_3) E_3 ( ) E_4 ( ) E_5$, one entity E with an omitted role in path P could be $E_4$, which has an omitted role represented as an empty bracket "( )". The entity prior to E, in this example, would be entity $E_3$. Thus, entity $E_3$ would equal entity S. The missing subpath would be the path between entity $E_3$ and $E_4$, in other words, $E_3 ( ) E_4$ (in bold font). It should be noted that this missing subpath "( )" could comprise of other role-entity-role combinations, such as: ( ) $E_{3.1}$ ( ) $E_{3.2}$ ( ) $E_{3.3}$ ( ), etc., and these combinations could be filled in automatically by the related subject matter disclosed in the section above identifying CROSS-REFERENCE TO RELATED SUBJECT MATTER. Specifically, the automatic fill-in, with reference to FIG. 5, could be done in the third line of section 508.

In any event, following the pseudo-code 500 of the fourth section, next, based on the model M, a default path DP is determined from the entity S to the entity E. One of three things may occur at this point: either exactly one DP is found

510, more than one path is found 512, or no default path DP is found 514. In the first case 510, if exactly one default path DP is found, the default path DP is inserted between S and E in the original path P. Then, for each role R in path DP, the role R and its inverse is removed from the model M (for the reasons given above). In the second case 512, however, if more than one default path DP is found, the set of default paths is remembered (stored) for that entity DP(E). Finally, in the third case 514, if no default path DP is found, the entire pseudo-code 500 algorithm is terminated.

In the fifth section 516 of the pseudo-code 500, for each possible combination C of one default path DP(E), for each entity E which still has an omitted role in path P, if no role or its inverse appears more than once in the default paths DE(E) in the combination C, then C is added to the list of valid combinations VC.

Finally, in the sixth and last section 518, for each valid combination VC, a new valid path VP is created, which may be a copy of the modified original path P. Then, for each default path DP(E) in the valid combination VC, the path DP(E) is inserted before the entity E in the path VP. Moreover, the path VP is added to the set of possible fully specified paths.

The net effect of this pseudo-code 500 is as follows. Given any path P between two entities, a source entity and a target entity, a user may partially specify the path P, by specifying some entity or role (or both) in the path P, and the result is a set of valid paths VP for such a specification (and subject to the restriction rules mentioned above). If only one valid path VP exists in the set, then this path can be used (automatically or not) as the path between the source entity and the target entity. If, however, no valid path VP exist, then the query is terminated (which can also be made known to the user). If, however, more than one valid path VP exists in the set, then the user can be prompted to select which valid path to follow. Thus, in one aspect of the presently disclosed subject matter, this feedback to the user regarding the set of valid paths VP can provide the user with a better understanding of path specification, so that next time a user makes a query, this user can provide enough specification so that only one valid path (in the optimal scenario) results, and the user does not have prompt a system embodying this pseudo-code 500 at all.

Aspects of a General Implementation in Block Diagram Form

Figure 6:
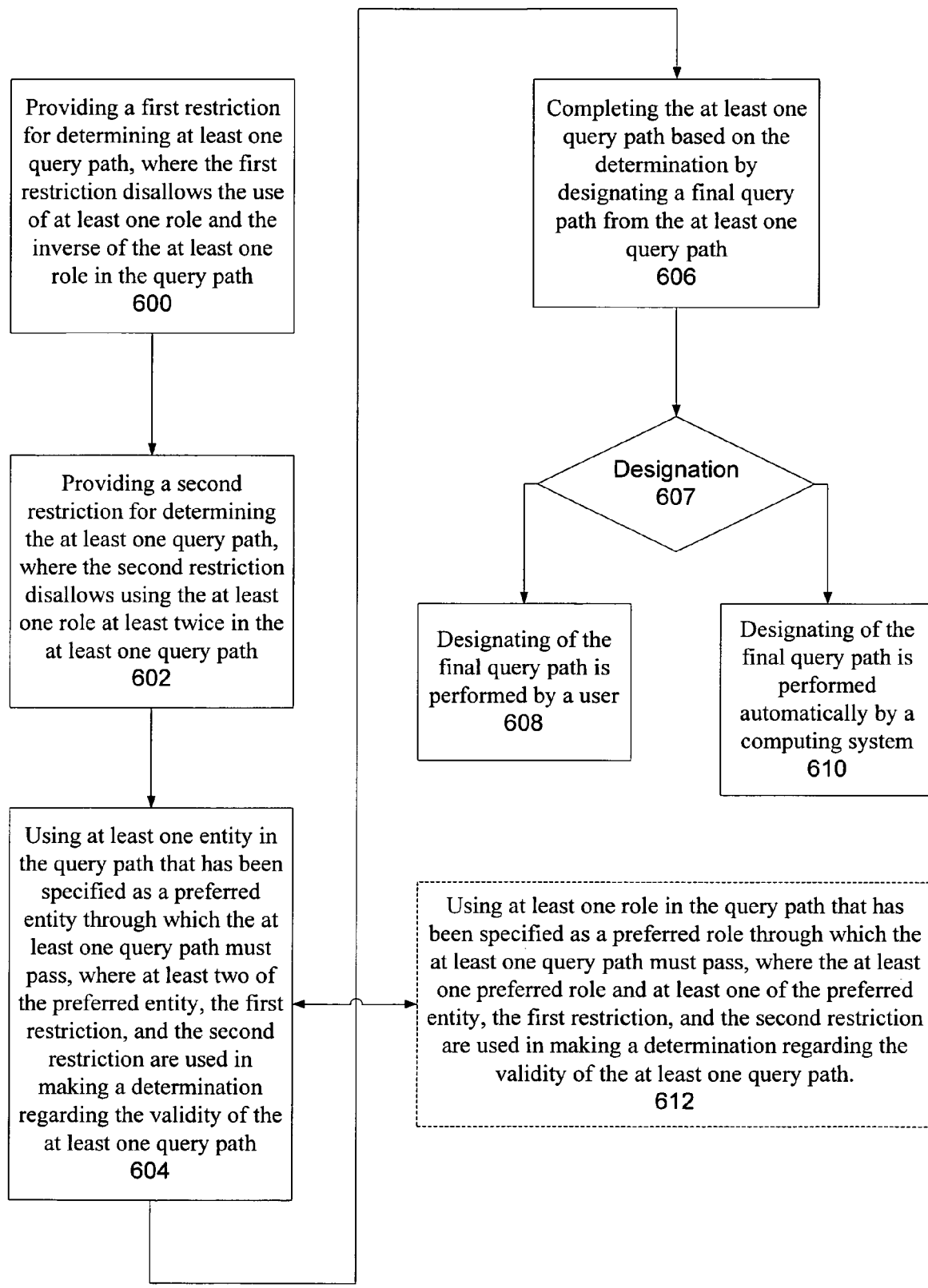
FIG. 6 illustrates in block diagram form one exemplary implementation.
Figure 7:
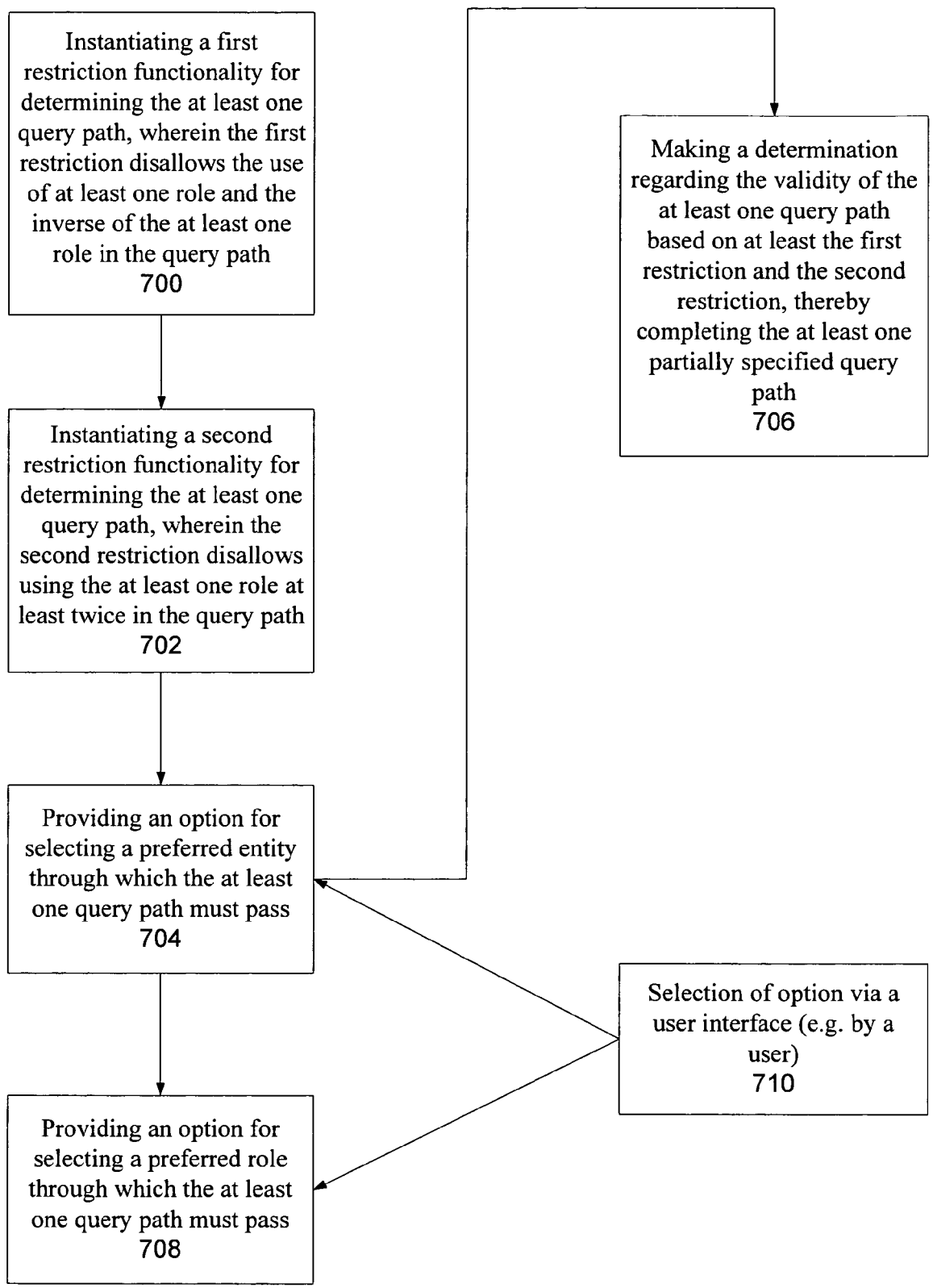
FIG. 7 illustrates in block diagram form another exemplary implementation.

FIGS. 6 and 7 provide illustrations of two exemplary and non-limiting implementations of the presently disclosed subject matter in block diagram form. In FIG. 6, a method is shown for completing at least one partially specified query path. Specifically, at block 600, a first restriction is provided for determining a query path, where the first restriction disallows the use of a role and its inverse in the query path. Next, at block 602, a second restriction is provided for determining the query path, where the second restriction disallows using the role at least twice in the query path. Once these restriction are set in place, this method can use specifications to further help complete the query path.

One such specification can include the selection of an entity to be used along the query path, which may be more intuitive for users to specify than a role (which, in essence, is a relationship). Thus, at block 604, an entity is used in the query path that has been specified as a preferred entity, through which the query path should (or in other implementation must) pass. At least two of the preferred entity, the first restriction, and the second restriction can be used in making a determination regarding the validity of the at least one query path. In other implementations all three can be used. Finally, at block 606, the at least one query path can be completed based on the aforementioned determination by designating a final query path from the at least one query path.

In some aspects of the presently disclosed subject matter, a decision can be made as to what type of designation is appropriate. For example, at block 608, the designation of the final query path can be performed by a user. Conversely, at block 610, the designation of the final query path can be performed automatically by a computing system. In other aspects, the determination regarding the validity of query path can performed at query-execution time. In still other aspects, at block 612 (in dashed lines to indicate an optional feature of this aspect), a role in the query path is used that has been specified as a preferred role through which the query path must pass (or in some cases should pass, depending on the implementation, i.e., whether this specification outweighs the other restrictions or specifications), where the preferred role and the preferred entity, the first restriction, and the second restriction are used in making a determination regarding the validity of the query path. These are but exemplary (and hence non-limiting) aspects of the presently disclosed subject matter, as those of skill in the art will readily appreciate.

Next, FIG. 7 illustrates an exemplary implementation of the presently disclosed subject matter in a computer readable medium format, where this medium bears tangible executable instructions for completing a partially specified query path. At block 700, a first restriction functionality is instantiated for determining the at least one query path, where the first restriction disallows the use of at least one role and the inverse of the at least one role in the query path. Similarly, at block 702, a second restriction functionality is instantiated for determining the query path, where the second restriction disallows using the at least one role at least twice in the query path. Then, at block 704, an option is provided for selecting a preferred entity through which the at least one query path must pass. And, finally, at block 706, a determination is made regarding the validity of the query path based on at least the first restriction and the second restriction, thereby completing the at least one partially specified query path-as explained in detail with reference to FIG. 5.

In still further aspects of the presently disclosed subject matter, the selecting of the preferred entity can made by a user, as indicated by block 710. In other aspects, the option is provided through a user interface, again, as indicated by block 710. And in yet other aspects, at block 708, an option can be provided for selecting a preferred role through which the query path must pass. As before, this is merely an exemplary implementation, it could, for instance, be combined or matched with other subject matter discussed herein, such as that related to FIGS. 5 and 6.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, completion of partially specified join paths and/or entities was discussed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A computing system for creating at least one fully specified query path from a partially specified query path, comprising:

a relational database storing a source entity, wherein the source entity corresponds to the starting point of the partially specified query path, wherein the partially specified query path comprises a plurality of entities and roles and a target entity, wherein the target entity corresponds to the ending point of the partially specified query path, wherein the source entity and the target entity also correspond to the starting point and the ending point of the at least one fully specified query path; and a processor programming to provide a first restriction for determining the at least one fully specified query path, wherein the first restriction disallows the use of at least one role and the inverse of the at least one role in between the source entity and the target entity and a second restriction for determining the at least one fully specified query path, wherein the second restriction disallows using the at least one role at least twice in between the source entity and the target entity, wherein said processor further specifies at least one entity in the partially specified query path as a preferred entity through which the at least one fully specified query path should pass, wherein a combination of the preferred entity, the first restriction, and the second restriction determine the validity of the at least one fully specified query path, whereby upon a determination of the validity, the at least one fully specified query path is completed from the partially specified query path.

2. The system according to claim 1, further comprising at least one role in the partially specified query path that has been specified as a preferred role through which the at least one fully specified query path should pass, wherein the preferred role functions together with the combination of the preferred entity, the first restriction, and the second restriction in order to determine the validity of the at least one fully specified query path.

3. The system according to claim 1, wherein the at least one entity in the partially specified query path is specified as a preferred entity by a user of the system.

4. The system according to claim 3, wherein the at least one entity is specified by the user via a user interface.

5. The system according to claim 1, wherein the determination of the validity of the at least one fully specified query path is performed at query execution time.

6. The system according to claim 1, wherein the at least one fully specified query path is completed automatically.

7. The system according to claim 1, wherein the at least one fully specified query path is completed with input from a user.

8. A computer-implemented method for completing a partially specified query path, comprising:

the computer providing a first restriction for determining at least one query path from the partially specified query path, wherein the first restriction disallows the use of at least one role and the inverse of the at least one role in the at least one query path;

the computer providing a second restriction for determining the at least one query path, wherein the second restriction disallows using the at least one role at least twice in the at least one query path;

the computer making a determination regarding the validity of the at least one query path using at least one entity in the at least one query path that has been specified as a preferred entity through which the at least one query path passes, wherein the at least two of the preferred entity, the first restriction, and the second restriction are used in making a determination regarding the validity of the at least one query path; and the computer designating a final query path from the at least one query path.

9. The method according to claim 8, further comprising following the determination, completing the at least one query path with user input.

10. The method according to claim 9, further comprising providing a user interface for the user input.

11. The method according to claim 8, further comprising following the determination, completing the at least one query path automatically.

12. The method according to claim 8, wherein the determination regarding the validity of the at least one query path is performed at query-execution time.

13. The method according to claim 8, further comprising using at least one role in the query path that has been specified as a preferred role through which the at least one query path passes.

14. The method according to claim 8, further comprising providing a third restriction that is based on changes in cardinality between any two entities in the partially specified query path.

15. A computer readable storage medium having tangible executable instructions stored thereon that when executed by a processor cause said processor to implement a method for completing at least one partially specified query path, said instructions comprising:

instructions for a first restriction functionality that determines at least one query path from the at least one partially specified query path, wherein the first restriction disallows the use of at least one role and the inverse of the at least one role in the at least one query path;

instructions for a second restriction functionality that determines the at least one query path from the at least one partially specified query path, wherein the second restriction disallows using the at least one role at least twice in the at least one query path;

instructions for.providing an option for selecting a preferred entity through which the at least one query path is fully completed; and instructions for making a determination regarding the validity of at least one fully completed query path that is based on the at least one query path, wherein the determination is made based on the first restriction, the second restriction, and the preferred entity.

16. The computer readable storage medium according to claim 15, wherein the selecting of the preferred entity is made by a user.

17. The computer readable storage medium according to claim 15, wherein the option is provided through a user interface.

18. The computer readable storage medium according to claim 15, further comprising instructions for providing an option for selecting a preferred role through which the at least one query path passes.

19. The computer readable storage medium according to claim 15, wherein making the determination is performed at query-execution time.

20. The computer readable storage medium according to claim 15, further comprising instructions for initializing a third restriction that is based on changes in cardinality between any two entities in the at least one query path.

* * * * *

UNITED STATES PATENT AND TRADEMARK OFFICE
CERTIFICATE OF CORRECTION

| | |
|---|---|
| PATENT NO. | : 7,945,559 B2 |
| APPLICATION NO. | : 11/386298 |
| DATED | : May 17, 2011 |
| INVENTOR(S) | : Christopher Alan Hays |

It is certified that error appears in the above-identified patent and that said Letters Patent is hereby corrected as shown below:

In column 1, line 8, delete "11/158,424 ," and insert -- 11/158,424, --, therefor.

In column 1, line 8, delete "2005 ," and insert -- 2005, -- therefor.

In column 10, line 24, in Claim 15, after "having" delete "tangible".

In column 10, line 39, in Claim 15, delete "for.providing" and insert -- for providing --, therefor.

Signed and Sealed this
Nineteenth Day of July, 2011

David J. Kappos
*Director of the United States Patent and Trademark Office*